United States Patent [19]

Raczek

[11] 3,890,418

[45] June 17, 1975

[54] SKINNING PROCESS FOR EXPANSION CASTING OF POLYMERIC FOAMS

[75] Inventor: Thaddeus A. Raczek, Apalachin, N.Y.

[73] Assignee: International Business Machines Corporation, Armonk, N.Y.

[22] Filed: Jan. 30, 1974

[21] Appl. No.: 438,100

Related U.S. Application Data

[63] Continuation-in-part of Ser. No. 212,653, Dec. 27, 1971, abandoned.

[52] U.S. Cl. .................. 264/54; 264/48; 264/338; 264/DIG. 14
[51] Int. Cl. .................. B29d 27/04; B29h 7/20
[58] Field of Search ......... 264/48, 54, 338, DIG. 14

[56] References Cited
UNITED STATES PATENTS

| 2,206,757 | 7/1940 | Talalay | 264/DIG. 14 |
|---|---|---|---|
| 3,127,457 | 3/1964 | DiPinto | 264/338 |
| 3,253,064 | 5/1966 | Buonaiuto | 264/53 |
| 3,431,331 | 3/1969 | Pincus et al. | 264/45 |
| 3,476,841 | 11/1969 | Bienert | 264/51 |
| 3,478,135 | 11/1969 | Randall | 264/45 |
| 3,493,449 | 2/1970 | Krug | 264/54 |
| 3,539,144 | 10/1970 | Krug | 264/338 |
| 3,541,192 | 11/1970 | Shapero et al. | 264/48 |
| 3,624,190 | 11/1971 | Cekada | 264/48 |
| 3,650,995 | 3/1972 | Erickson | 264/338 |

FOREIGN PATENTS OR APPLICATIONS

| 1,282,105 | 12/1961 | France | 264/338 |

OTHER PUBLICATIONS

Bishop, Mold Release, SPE Journal, May 1969, Vol. 25, pages 51–54.

*Primary Examiner*—Ronald W. Griffin
*Attorney, Agent, or Firm*—Gerald R. Gugger

[57] ABSTRACT

A process for the expansion casting of ABS foam which makes use of a gas permeable membrane on the mold cavity surfaces to produce a part having a skinned smooth surface with better surface finish and/or greater stiffness.

6 Claims, No Drawings

SKINNING PROCESS FOR EXPANSION CASTING OF POLYMERIC FOAMS

This application is a continuation-in-part of application Ser. No. 212,653, filed Dec. 27, 1971, now abandoned.

BACKGROUND OF THE INVENTION

Thermoplastic materials such as ABS can be compounded with heat activated blowing agents. These materials can then be used in expansion casting systems to mold parts by filling the mold cavity with the material, closing the cavity and heating. The blowing agent creates an internal pressure which foams the melted polymeric material to the shape of the mold cavity. Upon cooling the mold, the finished molded part can be removed.

CYCOLAC (a registered trademark of Borg-Warner Corporation) comes, for example, in structural foam grades JP and JS of CYCOLAC brand ABS. Grade JS is used primarily for expansion casting, while grade JP is used primarily for injection molding. However, grade JP can also be processed by the expansion casting technique. The expansion casting of CYCOLAC JS is described in a brochure entitled "CYCOLAC JS EXPANDABLE ABS FOR EXPANSION CASTING" published in October, 1967, by the Marbon Division of Borg-Warner Corporation. This thermoplastic is supplied in pellet form and incorporates, as an integral part of the pellet, a heat-sensitive chemical blowing agent that causes expansion and subsequent conformation of the molten plastic material to contours of the mold cavity. Expansion casting may be defined as the sequential heating and cooling of closed molds containing, for example, CYCOLAC JS. When exposed to heat, the built-in blowing agent decomposes emitting an inert gas that causes the softened pellets to expand and fuse together forming structurally sound light-weight cellular constructed parts.

For some applications, the above technique produces ABS parts with undesirable surface properties because of gas voids and uncoalesced molding material pellets. The reason for the presence of the voids is that gas bubbles are fomed as a result of the heating of the blowing agent and these bubbles along with air inherently present in the mold cavity become trapped between the solid mold cavity surface and the foam material itself. This results in the formation of pockets or voids in the outer surface of the foam material. Skinning effects were found to be non-existent. For example, where parts suitable for painting are required for use on machines as appearance parts having a smooth skinned surface, a conventional ABS expansion cast foamed part when painted still has visible surface voids and such voids generally have to be filled before painting to obtain a smooth finish. This results in an added operation which is both costly and time consumming. It would be more desirable and advantageous if a smooth skinned surface could be obtained when the part is expansion cast.

SUMMARY OF THE INVENTION

The present invention makes it possible to obtain the desired smooth skinned surface finish as the part is being expansion cast by placing a highly gas permeable membrane on the mold cavity surfaces. As a result, the blowing agent gases and any air present in the mold cavity can permeate through the membrane thereby collapsing the outer foam areas and causing the formation of a solid, non-foamed skin. The membrane must be permeable to gases and the molding material must not adhere to the membrane material.

Suitable membrane materials for ABS foam and other suitable polymer material systems which do not result in fiber entrapment or adherence with the foam material are fluorocarbon film, silicone rubber, silicone treated, clay coated kraft release paper, silicone rubber coated glass fabric and Teflon fiber glass. Other materials such as polyester fabric or talc coated paper could also be used, however, release from the molded part is more difficult because of fiber entrapment. All of these materials have relatively high gas permeability rates. However, mold releases such as silicones and fluorocarbons, and fluorocarbon release coating do not promote skinning. Also, films with relatively low gas permeability rates, such as polyethylene terephthalate resin, do not cause skinning.

The process of the present invention can be used advantageously to obtain an improved surfaced part suitable for painting and use in appearance parts on machines, and the like. Also, it enables a sandwich structure, skin on both sides of a foam core, to be obtained in one process rather than forming the core, extruding the sheets, and then bonding the foam to the sheets. A single processed structure would be simpler and more economical than the bonded structure. In still further applications, the process can be used to increase the flexural modulus of parts, thereby obtaining greater stiffness for the same total weight of material. Increasing the flexural modulus of a foam part by skinning increases the load that a part can support for a given maximum deflection. The skinning effect would be important in reducing the weight of molding material needed for large parts, such as pallets. The present process also has the advantage of enabling the skinning of one or more surfaces of a part selectively.

It is, then, a primary object of the present invention to provide a novel and improved skinning process for expansion casting of polymeric foams.

A further object of the present invention is to provide a novel and improved process for expansion casting of polymeric foams which includes means for collapsing the outer foam areas to cause formation of a solid, non-foamed skin.

A still further object of the present invention is to provide a novel and improved process for the expansion casting of ABS foam which makes use of a gas permeable membrane on the mold cavity surfaces to produce a skinned smooth surface.

The foregoing and other objects, features and advantages of the invention will be apparent from the following more particular description of preferred embodiments of the invention.

DESCRIPTION OF PREFERRED EMBODIMENTS

In carrying out the present invention a number of materials were used. The material molded was both grades JP and JS of the Borg-Warner CYCLAC structural foam. The permeable membrane sheet materials used were: Release Paper No. 001 (Appleton Coated Paper Company) which is silicone treated, clay coated kraft release paper; TEFLON FEP (a registered trademark of E. I. DuPont de Nemours & Company) which is a fluorocarbon film; COHRLASTIC 700 (a nonregistered trademark of Connecticut Hard Rubber Company) which is a silicone rubber, and silicone rubber coated glass fabric, grade 1015 of COHRLASTIC; and TEMP-R-GLAS (a registered trademark of Connecticut Hard Rubber Company) which is fiberglass impregnated or coated with Teflon. The ABS foam material is loaded into the mold until the mold is filled by either manual or pneumatic means in the manner set forth in the above-referenced brochure.

Specific examples of the process of the present invention which make use of these materials are set forth as follows:

EXAMPLE 1

ABS foam samples 8×8×0.375 inches of both the CYCOLAC JP and JS were molded in an aluminum box mold 8×8×0.375 inches. The samples were molded using the permeable sheet materials of 0.002 inch thick silicone treated, clay coated kraft release paper; 0.002 inch thick flurocarbon film; and 0.060 inch thick silicone rubber. The sheets were placed on one 8×8 inch side of the mold between the foam material and the mold. The mold was heated for one hour at 450°F. in an air circulating oven. The mold was cooled to room temperature and the molded sample removed. A definite skinning effect was obtained with the skin thickness being approximately 0.030 inches with the silicone and approximately 0.010 inches with the release paper and fluorocarbon film. Control samples of the foam material were also molded without using any permeable membrane sheet. The following tables indicate test results that were obtained:

A. MATERIAL: CYCOLAC JP

|  | Control | Clay Coated Kraft Paper | Fluorocarbon Film | Silicone Rubber |
| --- | --- | --- | --- | --- |
| Skin Thickness (inch) | None | .010 | .010 | .030 |
| Density (lbs/inch$^3$) | .0194 | .0197 | .0177 | .0195 |
| Specimen Thickness (inch) | .385 | .385 | .386 | .346 |

B. MATERIAL: CYCOLAC JS

|  | Control | Clay Coated Kraft Paper | Fluorocarbon Film | Silicone Rubber |
| --- | --- | --- | --- | --- |
| Skin Thickness (inch) | None | .010 | .010 | .030 |
| Density (lbs/inch$^3$) | .0221 | .0191 | .0194 | .0192 |
| Specimen Thickness (inch) | .385 | .381 | .390 | .333 |

A practical range of thickness of these sheet materials which will produce skinning is 0.001–0.002 inch for the clay coated kraft release paper; 0.002–0.010 inch for the fluorocarbon film; and 0.030–0.060 inch for the silicone rubber.

EXAMPLE 2

A 0.010 inch thick sheet of fluorocarbon film, 4×8 inches in size, was placed in one half of a 8×8×0.375 inch aluminum box mold. The mold was filled with CYCOLAC JS-50801 blue and heated for one hour at 450°F. in an air circulating oven. The mold was cooled to room temperature and the molded part was removed. The fluorocarbon sheet was stripped from the part.

The area with the fluorocarbon sheet has a very smooth, glassy surface. The area without the fluorocarbon sheet had surface voids and uncoalesced areas between the molding material pellets. The skin formed on the fluorocarbon surface was approximately 0.010 inches thick.

EXAMPLE 3

A 0.062 inch thick sheet of silicone rubber was placed in the bottom of a 8×8×0.375 inch aluminum box mold. The mold was filled with CYCOLAC JS-50801 blue. Two sheets of the silicone treated, clay coated kraft paper were placed on top of the molding material. The cover was placed on the mold and the mold heated for 65 minutes at 450°F. in an air circulating oven. The mold was cooled to room temperature and the molded part and sheets removed.

The molded part surfaces against the sheets of paper and rubber were smooth and void free. Skin thickness varied from 0.010 to 0.020 inches. The 0.375 inch high sides without sheeting had voids and areas of uncoalesced molding material pellets.

EXAMPLE 4

A sheet of silicone rubber coated glass fabric, grade 1015 of COHRLASTIC, was placed in the bottom of the 8×8×0.5 inch aluminum box mold. The mold was filled with CYCOLAC JS and heated for 1 hour at 450°F. in an air circulating oven. The part was removed after cooling to room temperature.

A cross-section of the molded part showed a solid skin, 0.09375 inches thick, formed against the silicone rubber coated glass fabric surface. The opposite side had voids and no skin.

A practical range of thickness for the silicone rubber coated glass fabric is 0.005–0.016 inch.

TEMP-R-GLAS sheets (Teflon coated fiberglass) having a thickness of 0.003–0.015 inch were also used in similar fashion and good results were obtained.

EXAMPLE 5

In this example, a study was made dealing with the effects of skinning in relation to the flexural properties of expansion cast ABS foam.

ABS foam samples, 8×8×0.375 inches and 8×8×0.5 inches, were molded in an aluminum box mold. The materials molded were CYCOLAC JS-1000 and CYCOLAC Y-77-1000. Two sheet materials were evaluated. Appleton No. 201 release paper which is a 0.002 inch thick silicone treated supercalendered kraft paper and COHRLASTIC 1015 which consists of a base of 0.007 inch glass fabric, number 128, and a 0.009 inch rubber coating giving the sheet a total thickness of 0.016 inches. Sheet material was placed on both sides of the mold cavity and the mold filled with foam material. The mold was heated for one hour at 450°F. in an air circulating oven, after which it was cooled to room temperature and the sample removed. A definite skinning effect was obtained on both sides of the sample next to the silicone rubber coated glass fabric or the silicone treated release paper. Control samples were also molded of the foam material without the use of any permeable sheets.

A test procedure was performed per ASTM D-790, Flexural Properties of Plastic. The rate of cross head motion used was 0.2 inches per minute. The test data is presented in the following table:

| SKINNING MATERIAL | Two Sheets Silicone Release Paper | | | | COHRLASTIC 1015 | |
|---|---|---|---|---|---|---|
| ABS Foam | JS-1000 | | Y-77-1000 | | JS-1000 | |
| Thickness, nominal | ⅜ Inch | | ⅜ Inch | | ½ Inch | |
| Skin thickness, inch | Control No skin | .020 | Control No skin | .005 | Control No skin | .040 and .020 |
| Number of samples | 7 | 8 | 8 | 8 | 4 | 4 |
| Flexural Modulus, psi, average | 113,500 | 127,300 | 91,300 | 138,900 | 91,600 | 154,500 |
| Flexural strength, psi, average | 2,910 | 3,220 | 2,300 | 2,810 | 2,540 | 2,960 |
| Density lbs/inch³, average | .0191 | .0172 | .0169 | .0168 | .0173 | .0154 |
| Flexural Modulus Density | $5.94 \times 10^6$ | $7.40 \times 10^6$ | $5.40 \times 10^6$ | $8.27 \times 10^6$ | $5.29 \times 10^6$ | $10.03 \times 10^6$ |
| Flexural strength Density | $1.52 \times 10^5$ | $1.87 \times 10^5$ | $1.36 \times 10^5$ | $1.67 \times 10^5$ | $1.47 \times 10^5$ | $1.92 \times 10^5$ |

The types of skin produced in the above test ranged from 0.005 inches to 0.040 inches thick. The main advantage of a 0.005 inch skin is the improvement of the surface finish. As the skin thickness increases, the flexural properties improve accordingly. When a thin skin was desired, the Appleton No. 201 release paper was used whereas with material, such as COHRLASTIC 1015, a thick skin can be produced so that an increase up to 70% in flex modulus is noted. The two types of foam used in the test had similar properties except that the Y-77-1000 foamed more than the JS-1000. The Y-77-1000 formulation develops higher expansion pressures for smoother surfaces, however, surface porosity still occurs when it is molded without the use of a permeable sheet. To make the improvement in strength more evident, a ratio was calculated between the flexural modulus and density. This provides a basis for comparison between the different skins based on stiffness per unit weight. Usually it is an economic advantage to obtain greater stiffness with less weight of material. The calculated ratio of flexural strength to density also illustrates the rigidity effect.

It is evident that the flexural properties of the foam material are improved with skinning and the ratios of flex modulus and stress to density clearly show that the thicker skins can be used to increase strength. Skins produced by the process of the present invention, then, are useful in enhancing both the surface finish and the flexural properties.

While the invention has been particularly shown and described with reference to preferred embodiments thereof, it will be understood by those skilled in the art that various changes in form and details may be made therein without departing from the spirit and scope of the invention.

What is claimed is:

1. A process for expansion casting a polymeric foam object having a skinned smooth surface which comprises:
    placing a highly gas permeable membrane sheet on the surface of a mold cavity;
    placing an ABS thermoplastic foam material into the mold until the mold is filled, said foam material containing a heat-sensitive, chemical blowing agent which when exposed to heat emits an inert gas which causes said material to expand to the contour of the mold cavity; and
    heating said mold to a temperature sufficient to activate said blowing agent and cause expansion of said material, the blowing agent gas and any air in said cavity permeating through said sheet to produce a smooth skin on the surface of the foam material adjacent the sheet with no adherence between said sheet and the foam material.

2. A process for expansion casting a polymeric foam object having a skinned smooth surface which comprises:
    placing a highly gas permeable sheet of from 0.001–0.002 inch thick silicone treated, clay coated kraft release paper on the surface of a mold cavity;
    placing an ABS thermoplastic foam material into the mold until the mold is filled, said foam material containing a heat-sensitive, chemical blowing agent which when exposed to heat emits an inert gas which causes said material to expand to the contour of the mold cavity; and
    heating said mold to a temperature sufficient to activate said blowing agent and cause expansion of said material, the blowing agent gas and any air in said cavity permeating through said sheet to produce a smooth skin on the surface on the foam material adjacent the sheet with no adherence between said sheet and the foam material.

3. A process for expansion casting a polymeric foam object having a skinned smooth surface which comprises:
    placing a highly gas permeable sheet of from 0.002–0.010 inch thick fluorinated ethylene propylene on the surface of a mold cavity;
    placing an ABS thermoplastic foam material into the mold until the mold is filled, said foam material containing a heat-sensitive, chemical blowing agent which when exposed to heat emits an inert gas which causes said material to expand to the contour of the mold cavity; and
    heating said mold to a temperature sufficient to activate said blowing agent and cause expansion of said material, the blowing agent gas and any air in said cavity permeating through said sheet to produce a smooth skin on the surface of the foam material adjacent the sheet with no adherence between said sheet and the foam material.

4. A process for expansion casting a polymeric foam object having a skinned smooth surface which comprises:

placing a highly gas permeable sheet of from 0.030–0.060 inch thick silicone rubber on the surface of a mold cavity;

placing an ABS thermoplastic foam material into the mold until the mold is filled, said foam material containing a heat-sensitive, chemical blowing agent which when exposed to heat emits an inert gas which causes said material to expand to the contour of the mold cavity; and heating said mold to a temperature sufficient to activate said blowing agent and cause expansion of said material, the blowing agent gas and any air in said cavity permeating through said sheet to produce a smooth skin on the surface on the foam material adjacent the sheet with no adherence between said sheet and the foam material.

5. A process for expansion casting a polymeric foam object having a skinned smooth surface which comprises:

placing a highly gas permeable sheet of from 0.005–0.016 inch thick silicone rubber coated glass fabric on the surface of a mold cavity;

placing an ABS thermoplastic foam material into the mold until the mold is filled, said foam material containing a heat-sensitive, chemical blowing agent which when exposed to heat emits an inert gas which causes said material to expand to the contour of the mold cavity; and heating said mold to a temperature sufficient to activate said blowing agent and cause expansion of said material, the blowing agent gas and any air in said cavity permeating through said sheet to produce a smooth skin on the surface of the foam material adjacent the sheet with no adherence between said sheet and the foam material.

6. A process for expansion casting a polymeric foam object having a skinned smooth surface which comprises:

placing a highly gas permeable sheet of from 0.003–0.015 inch thick flourocarbon film coated fiberglass on the surface of a mold cavity;

placing an ABS thermoplastic foam material into the mold until the mold is filled, said foam material containing a heat-sensitive, chemical blowing agent which when exposed to heat emits an inert gas which causes said material to expand to the contour of the mold cavity; and heating said mold to a temperature sufficient to activate said blowing agent and cause expansion of said material, the blowing agent gas and any air in said cavity permeating through said sheet to produce a smooth skin on the surface of the foam material adjacent the sheet with no adherence between said sheet and the foam material.

* * * * *